United States Patent Office 3,641,056
Patented Feb. 8, 1972

3,641,056
10-(AMINOMETHYL)- AND (AMINOETHYL)-
DIBENZ [b,f] OXEPINS
Walter Schindler, Riehen, and Hans Blattner, Basel, Switzerland, assignors to Ciba-Geigy Corporation, Ardsley, N.Y.
No Drawing. Continuation-in-part of abandoned application Ser. No. 466,840, June 24, 1965. This application Jan. 6, 1970, Ser. No. 1,063
Int. Cl. C07d 9/00
U.S. Cl. 260—333
8 Claims

ABSTRACT OF THE DISCLOSURE 10-(aminomethyl)- and 10 - (aminoethyl)dibenz[b,f] oxepins such as 10-(dimethylaminomethyl)dibenz[b,f] oxepin, and pharmaceutically acceptable acid addition salts thereof have depressant effects on the central nervous system and are thus useful as sedatives, anticonvulsives and anesthesia potentiators.

CROSS-REFERENCE

This is a continuation-in-part of Ser. No. 466,840 filed June 24, 1965, now abandoned.

DETAILED DESCRIPTION

This invention pertains to compounds of the formula:

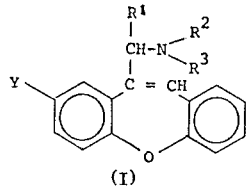

(I)

wherein:

$R^1$ is hydrogen or methyl;
each of $R^2$ and $R^3$ is hydrogen or (lower)alkyl; and
Y is hydrogen, chloro or methoxy.

In addition the present invention pertains to the pharmaceutically acceptable non-toxic acid addition salts of the above compounds, to methods and compositions for pharmaceutical uses of these compounds and their salts, and to processes and chemical intermediates employed in their preparation.

By the term "(lower)alkyl" and derivations thereof utilizing the root "alk," is intended a group comprising a monovalent branched or straight hydrocarbon chain containing from one to six carbon atoms. Representative of (lower)-alkyl groups are thus methyl, ethyl, propyl, isopropyl, butyl, sec butyl, t-butyl, pentyl, isopentyl, hexyl and the like.

These compounds have adrenolytic and central nervous system (CNS) depressant properties, making them useful as sedative, anticonvulsive and anesthesia-potentiating agents, and in the treatment of conditions of tension and excitement. They can if desired, be administered in combination with other pharmaceutical agents, e.g., with antidepressants.

The 10-(aminomethyl)- and 10-(aminoethyl)oxepins of the present invention are administered parenterally or orally to achieve the CNS depressant effect, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the 10-(aminomethyl)- and 10-(aminoethyl)oxepins to a suitable fine size and mixing with a similarly comminuted diluent pharmaceutical carrier such as an edible carbohydrate material as for example, starch. Sweetening, flavoring, preservative dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving thhe compound in a suitably flavored aqueous sucrose solution while elixirs are prepared through the use of a non-toxic alcoholic vehicle. Suspensions can be formulated by dispersing the compound in a non-toxic vehicle in which it is insoluble.

Fluid unit dosage forms for parenteral administration can be prepared by suspending or dissolving a measured amount of the compound in a non-toxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration.

Units dosage for rectal administration include suppositories which consist of a combination of the oxepin derivative, or a suitable salt thereof, with a neutral fatty foundation and gelatin rectal capsules which contain a combination of the oxepin or a suitable salt thereof with polyethylene glycols (Carbowaxes) of suitable molecular weight.

The daily dosages of these oxepins as the free base or of a non-toxic salt thereof vary between 10 and 800 mg.

for adult patients. Suitable dosage units such as dragees (sugar coated tablets), tablets, suppositories or ampoules preferably contain 5–50 mg. of an oxepin according to the invention or of a non-toxic salt thereof.

One important embodiment of the present invention, particularly for preparing solid pharmaceutical formulations, is the pharmaceutically acceptable non-toxic acid addition salts of these oxepin derivatives. Such pharmaceutically acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enanthic and the like acids.

The compounds of the present inveniton are produced by reacting a reactive ester of a hydroxyl oompound of the formula:

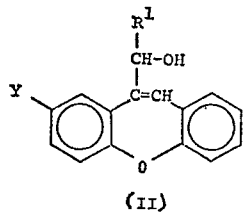

(II)

wherein $R^1$ and Y are as defined above, with an amine of the formula:

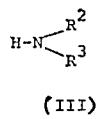

(III)

wherein $R^2$ and $R^3$ are as defined above.

The halides, particularly the bromides, are used as reactive esters of hydroxyl compounds of Formula II. Other derivatives of this type are the esters of sulfonic acids such as the tosyl or mesyl esters.

This reaction is performed, for example, in inert organic solvents such as benzene, lower alkanols or alkanones or also in water. Alternatively an excess of amine can serve as acid binding agent and, optionally, also as sole reaction medium. The reaction is more or less exothermic depending on the nature of the substituents $R^1$, $R^2$ and $R^3$ and, if necesary, the reaction is completed by the application of heat. The compounds of Formula II can be reacted with, for example, dimethylamine, methyethylamine, diethylamine, di-n-propylamine, ammonia, methylamine, ethylamine, n-propylamine, isopropylamine, n-butylamine, isobutylamine or the like.

Starting matherials of Formula II include 10-bromomethyldibenz[b,f]oxepin, its 8-chloro- and 8-methoxy derivatives.

The 10 - bromomethyldibenz[b,f]oxepin mentioned above is obtained, for example, from the known 10-methyldibenz[b,f]oxepin through bromination with N-bromosuccinimide. The corresponding 2-methoxy-11-bromomethyl derivative can be produced for example, in the following way. The known 2-phenoxy-5-methoxy-benzoic acid is reacted with ethanol to form the ethyl ester. The ester can be reduced with lithium aluminum hydride to form 2-phenoxy-5-methoxybenzyl alcohol which, when treated with phosphorus tribromide, yields 2-phenoxy-5-methoxybenzyl bromide. Potassium cyanide converts the bromide into the 2-phenoxy-5-methoxyphenylacetonitrile. The nitrile is hydrolysed by means of potassium hydroxide to yield 2-phenoxy-5-methoxyphenylacetic acid which is cyclized with polyphosphoric acid to yield 2-methoxydibenz[b,f]oxepin-10(11H)-one. The sodium derivative is obtained therefrom through treatment with sodium amide, and then alkylated with methyl iodide to form 2-methoxy-11-methyldibenz[b,f]oxepin-10(11H)-one. This is reduced by means of lithium aluminum hydride to 2-methoxy-11-methyl-10,11-dihydrodibenz[b,f]oxepin-10-ol and the latter is converted with thionyl chloride into 2-methoxy-10-chloro-11-methyl-10,11-dihydrodibenz[b,f]oxepin. Elimination of hydrogen chloride from this by means of potassium tertiary butylate yields 11-methyl-2-methoxydibenz[b,f]oxepin which finally is brominated with bromosuccinimide to form 2-methoxy-11-bromomethyldibenz[b,f]oxepin, alternatively named as 8 - methoxy - 10 - bromomethyldibenz[b,f]oxepin. Other reactive esters of hydroxyl compounds of Formula II substituted in the benzene nuclei can be produced analogously.

The following examples set forth the manner and process of making typical embodiments of the invention, without being a limitation thereof, and include the best mode contemplated for carrying out the invention.

PREPARATION 24.4 g. of 2-phenoxy-5-methoxybenzoic acid are refluxed for 20 hours with 100 ml. of absolute benzene, 12.5 ml. of absolute ethanol and 2.4 ml. of concentrated sulphuric acid by removing the water formed. The reaction mixture is then cooled to 10° C., water and ice are added and then 2 N sodium carbonate solution is added while stirring until the reaction is alkaline. The organic phase is then removed, washed with water, dried over calcium chloride and concentrated in vacuo. Distillation of the residue under high vacuum yields 2-phenoxy-5-methoxybenzoic acid ethyl ester, B.P. 126–129°/0.007 torr.

27.2 g. of this ester are dissolved in 100 ml. of absolute diethyl ether and the solution is added dropwise within half an hour to 2.4 g. of lithium aluminum hydride in 100 ml. of absolute diethyl ether. The reaction mixture is refluxed for 5 hours, cooled to 15° C. and 10 ml. of water are slowly added. The precipitate formed is filtered off under suction and washed with diethyl ether. The filtrate is washed with water, dried over sodium sulfate and concentrated in vacuo. The residue is distilled under high vacuum whereupon 2-phenoxy-5-methoxybenzyl alcohol is obtained, B.P. 137–139° C./0.001 torr. This solidifies and, recrystallized from cyclohexane, melts at 53–55.4° C.

23 g. of this benzyl alcohol derivative are dissolved in 70 ml. of absolute benzene. The solution is added dropwise within 1 hour at 0–10° C. to 12 g. of phosphorus tribromide and the mixture is heated for 1 hour at 50–55° C. It is then cooled to 15° C., ice and water are added and the organic phase is removed. This is washed neutral with 2 N sodium hydrogen carbonate solution and with water, dried over sodium sulfate and concentrated in vacuo. The residue, 2-phenoxy-5-methoxybenzyl bromide, crystallizes and melts at 92° C.

29.3 g. of this crude benzyl bromide derivative are added within 1 hour to a refluxing mixture of 15 g. of pulverized potassium cyanide in 130 ml. of ethanol and the whole is further refluxed for 3 hours. The reaction mixture is cooled to 15° C., concentrated in vacuo, poured into water and extracted with diethyl ether. The ethereal solution is washed with water, dried over sodium sulfate and evaporated in vacuo. Distillation of the residue under high vacuum at 134–138° C./0.005 torr yields 2-phenoxy-5-methoxyphenylacetonitrile. It crystallizes from methylcyclohexane, M.P. 47–49° C.

23.9 g. of this crude phenylacetonitrile derivative are refluxed for 21 hours with 24 ml. of 50% potassium hydroxide solution and 100 ml. of ethanol. The reaction mixture is then concentrated in vacuo and the residue is dissolved in water. The aqueous solution is extracted with diethyl ether and acidified with concentrated hydrochloric acid until the reaction is acid to Congo paper. A precipitate is thus formed which is washed with water and dried in vacuo at 70° C. Recrystallization from cyclohexane yields 2 - phenoxy-5-methoxyphenylacetic acid, M.P. 92–95.5° C.

25.8 g. of 2 - phenoxy-5-methoxyphenylacetic acid are dissolved at 60° C. in 235 g. of polyphosphoric acid. The temperature is raised to 90–95° C. and maintained there for 20 minutes. The reaction mixture is then cooled to 70° C. and poured into water and extracted with diethyl ether. The ether solution is washed with saturated sodium hydrogen carbonate solution and water until the washing water is neutral, dried over sodium sulfate and concentrated in vacuo. On cooling to 0° C., 2-methoxy-dibenz[b,f]oxepin-10(11H) - one crystallizes out of the ethereal solution, M.P. 75.8–78.5° C.

A suspension of 4 g. of sodium amide in 12 ml. of absolute toluene is added dropwise within 15 minutes to a solution of 24 g. of 2 - methoxydibenz[b,f]oxepin - 10 (11H)-one in 140 ml. of absolute benzene while stirring and the whole is refluxed for 2 hours. The reaction mixture is cooled to 45° C. and 18 g. of methyl iodide are added dropwise within 1 hour at this temperature whereupon the whole is stirred for another 72 hours. It is then refluxed for 4 hours, cooled to 15° C. and poured into water and ice. The organic phase is separated, washed with water, dried over calcium chloride and concentrated in vacuo. Distillation of the residue under high vacuum yields 2 - methoxy-11-methyldibenz[b,f]oxepin-10(11H)-one, B.P. 163–165° C./0.015 torr.

A solution of 184 g. of 2 - methoxy-11-methyl-dibenz[b,f]oxepin-10(11H)-one in 500 ml. of absolute diethyl ether is added dropwise within 1 hour to a suspension of 22 g. of lithium aluminum hydride in 400 ml. of absolute diethyl ether. The reaction mixture is then refluxed for 5 hours. After cooling, 40 ml. of water are carefully added, the precipitate formed is filtered off under suction and washed with diethyl ether. The filtrates are combined and the precipitate and filtrate are worked up.

Ice and concentrated hydrochloric acid are added to the precipitate while stirring. The organic part which does not dissolve is filtered off under suction and washed with water. Recrystallization from ethanol yields a 2-methoxy-11 - methyl-10,11-dihydro-dibenz[b,f]oxepin-10-ol, probably the cis form, which melts at 132–135.5° C.

The ethereal solution is washed with water, dried over sodium sulfate and concentrated. The oily residue contains a mixture of isomers of 2-methoxy-11-methyl-10,11-dihydro-dibenz[b,f]oxepin-10 - ols, which mixture is further worked up as crude product.

A solution of 22 g. of thionyl chloride in 200 ml. of absolute benzene is added dropwise within half an hour to a solution of 40.7 g. of 2-methoxy-11-methyl-10,11-dihydrodibenz[b,f]oxepin-10-ol in 400 ml. of absolute benzene and 48 g. of absolute pyridine, the addition being made at 10–20° C. while stirring well. The reaction mixture is then stirred for 4 hours at a temperature of 40–50° C. cooled, the reaction solution is poured into water and the organic phase is removed. This is washed with 2 N hydrochloric acid and water, dried over sodium sulfate and concentrated in vacuo at 50° C. The crude 2-methoxy - 10-chloro-11-methyl-10-chloro-11-methyl-10,11-dihydrodibenz[b,f]oxepin remains.

A solution of 40 g. of crude 2-methoxy-10-chloro-11-methyl - 10,11-dihydrodibenz[b,f]oxepin and 21 g. of potassium tert. butylate in 250 ml. of absolute toluene is refluxed for 16 hours. After cooling to 20° C., the reaction mixture is poured into water, the organic phase is removed and washed well with water, dried over sodium sulfate and concentrated in vacuo. The residue obtained is distilled under high vacuum. The 2-methoxy-11-methyldibenz[b,f]oxepin boils at 144–146.5° C./0.001 torr.

10 g. of 2-methoxy-11-methyldibenz[b,f]oxepin are dissolved in 80 ml. of carbon tetrachloride and 8.0 g. of pulverized N-bromosuccinimide are added. The reaction mixture is refluxed for 1 hour while stirring and exposed to two 200 watt lamps until all the succinimide floats on the surface of the solution. It is then cooled to 20° C., the succinimide is filtered off under suction and washed with carbon tetrachloride. The filtrate is washed with water, dried over sodium sulfate and concentrated in vacuo whereupon 2-methoxy-11-bromomethyldibenz[b,f]oxepin crystallizes out, M.P. 115–117° C. from benzene. This compound can also be described as 8-methoxy-10-bromomethyldibenz[b,f]oxepin.

In similar fashion is obtained 8-chloro-10-bromomethyldibenz[b,f]oxepin, 10 - (1 - bromoethyl)dibenz[b,f]oxepin and 10-bromomethyldibenz[b,f]oxepin.

EXAMPLE 1

151.5 g. of 10-bromomethyldibenz[b,f]oxepin are dissolved in 380 ml. of absolute benzene and the solution is added to a solution of 45 g. of dimethylamine in 450 ml. of absolute benzene. The reaction mixture is then heated for 1 hour at 50–60°. It is then cooled to 20°, washed well with water, dried over potassium carbonate and the solvent is evaporated off in vacuo. The residue is distilled under high vacuum whereupon 10 - (dimethylaminomethyl)dibenz[b,f]oxepin passes over at 128–130° C./0.004 torr. The base is converted into the hydrochloride with ethanolic hydrochloric acid which, recrystallized from ethanol, melts at 234–236° C.

10-(methylaminomethyl)dibenz[b,f]oxepin, B.P. 145° C./0.004 torr, hydrochloride M.P. 185–188° C. from absolute ethanol is produced analogously from 10-bromomethyldibenz[b,f]oxepin, and methylamine.

EXAMPLE 2

In a similar fashion to that described in Example 1, but employing 10-(1-bromoethyl)dibenz[b,f]oxepin, there is obtained 10 - [1 - (dimethylamino)ethyl]dibenz[b,f]oxepin, B.P. 135–140° C./0.005 torr, hydrochloride, M.P. 130–132° C. and 10-[1-(methylamino)ethyl]dibenz[b,f]oxepin, B.P. 140–145° C./0.005 torr, hydrochloride, M.P. 235–237° C.

EXAMPLE 3

Utilizing 8 - methoxy-10-bromomethyldibenz[b,f]oxepin in the procedure of Example 1 there is obtained 8-methoxy - 10 - (dimethylaminomethyl)dibenz[b,f]oxepin hydrochloride, M.P. 204–205° C. and 8 - methoxy-10 - (methylaminomethyl)dibenz[b,f]oxepin hydrochloride, M.P. 151.5–154° C.

EXAMPLE 4

By employing dimethylamine and diethylamine with 8-chloro-10-bromomethyldibenz[b,f]oxepin there are respectively obtained 8-chloro-10-(dimethylaminomethyl)-dibenz[b,f]oxepin, M.P. 68–69° C. (base), hydrochloride M.P. 242–244° C., and 8-chloro-10-(diethylaminomethyl)dibenz[b,f]oxepin, B.P. 155–157° C./0.04 torr, hydrochloride, M.P. 182–184° C.

EXAMPLE 5

250 g. of 10-dimethylaminomethyldibenz[b,f]oxepin hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 250 g. of magnesium stearate and 32 g. of colloidal silicon dioxide are mixed in and the mixture is pressed into 10,000 tablets each weighing 100 mg. and containing 25 mg. of the above oxepin (hydrochloride). The tablets may be grooved if desired for better adaptation of the dosage.

EXAMPLE 6

A granulate is produced from 250 g. of 10-dimethylaminomethyldibenz[b,f]oxepin hydrochloride, 175.90 g. of lactose and the alcoholic solution of 10 g. of stearic acid. After drying, it is mixed with 56.60 g. of colloidal silicum dioxide, 165 g. of talcum, 20 g. of potato starch and 2.50 g. of magnesium stearate and the mixture is pressed into 10,000 dragee cores. These are then coated with a concentrated syrup made from 502.28 g. of crystallized saccharose, 6 g. of shellac, 10 g. of gum arabic, 0.22 g. of dyestuff and 1.5 g. of titanium dioxide and dried. The dragees obtained each weigh 120 mg. and contain 25 mg. of the above oxepin (hydrochloride).

What is claimed is:
1. A compound of the formula:

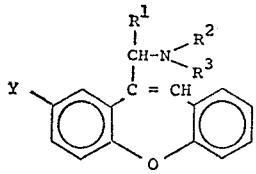

wherein
$R^1$ is hydrogen or methyl;
each of $R^2$ and $R^3$ is hydrogen or (lower)alkyl; and
Y is hydrogen, chloro or methoxy.

2. A pharmaceutically acceptable non-toxic acid addition salt of a compound according to claim 1.

3. A compound according to claim 1 wherein each of $R^2$ and $R^3$ is hydrogen or methyl.

4. A compound according to claim 1 which is 10-(dimethylaminomethyl)dibenz[b,f]oxepin.

5. A compound according to claim 1 which is 10-(methylaminomethyl)dibenz[b,f]oxepin.

6. A compound according to claim 1 which is 10-[1-(dimethylamino)ethyl]dibenz[b,f]oxepin.

7. A compound according to claim 1 which is 8-chloro-10-(dimethylaminomethyl)dibenz[b,f]oxepin.

8. A compound according to claim 1 which is 8-chloro-10-(diethylaminomethyl)dibenz[b,f]oxepin.

References Cited

UNITED STATES PATENTS

| | | | |
|---|---|---|---|
| 3,100,207 | 8/1963 | Zirkle | 260—333 |
| 3,356,680 | 12/1967 | Schindler et al. | 260—268 |

NORMA S. MILESTONE, Primary Examiner

U.S. Cl. X.R.

260—999